United States Patent
Nakanishi et al.

(10) Patent No.: US 12,422,941 B2
(45) Date of Patent: Sep. 23, 2025

(54) SENSOR SYSTEM, METHOD FOR DRIVING SENSOR MODULE AND STORAGE MEDIUM

(71) Applicant: Japan Display Inc., Tokyo (JP)

(72) Inventors: Takayuki Nakanishi, Tokyo (JP); Yuto Kakinoki, Tokyo (JP); Tadashi Hanegi, Kanagawa (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/597,073

(22) Filed: Mar. 6, 2024

(65) Prior Publication Data

US 2024/0319809 A1 Sep. 26, 2024

(30) Foreign Application Priority Data

Mar. 23, 2023 (JP) .................................. 2023-046951

(51) Int. Cl.
*G06F 3/041* (2006.01)
(52) U.S. Cl.
CPC .......... *G06F 3/0412* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 11,550,398 B2 * | 1/2023 | Nakao | G06F 3/016 |
| 2013/0342498 A1 | 12/2013 | Kim et al. | |
| 2014/0049486 A1 | 2/2014 | Kim et al. | |
| 2014/0049508 A1 | 2/2014 | Kim et al. | |

* cited by examiner

Primary Examiner — Stephen T. Reed
(74) Attorney, Agent, or Firm — K&L Gates LLP

(57) ABSTRACT

A sensor system according to an embodiment of the present invention includes: a sensor module including a sensor panel arranged on a display panel; and a processor capable of driving the sensor module in a noncontact manner, wherein the processor is configured to detect a first input operation based on a detection target approaching the sensor panel, and then measure an amount of movement from a first point based on movement of the detection target in a direction away from the sensor panel after the detection target approaches the sensor panel up to the first point, and detect a second input operation based on a criterion different from the first input operation when the detection target approaches the sensor panel again after the amount of movement exceeds a threshold value.

14 Claims, 9 Drawing Sheets

SENSOR SYSTEM, METHOD FOR DRIVING SENSOR MODULE AND STORAGE MEDIUM

CROSS REFERENCE TO RELATED APPLICATIONS

This application claims the benefit of priority to Japanese Patent Application No. 2023-046951, filed on Mar. 23, 2023, the entire contents of which are incorporated herein by reference.

FIELD

An embodiment of the present invention relates to a sensor system. For example, an embodiment of the present invention relates to a sensor system including a display device on which a noncontact sensor module is mounted, and a method for driving the sensor module in the sensor system.

BACKGROUND

A touch sensor is widely used as an interface for inputting information to an information terminal. Currently, a mainstream touch sensor specifies a position where a finger or a palm of a person or an input jig such as a touch pen (hereinafter, these are referred to as "detection targets") directly contacts the touch sensor (U.S. Patent Application Publication No. 2014/0049486, U.S. Patent Application Publication No. 2013/0342498, and U.S. Patent Application Publication No. 2014/0049508). On the other hand, in recent years, a noncontact sensor (hover sensor) has been developed in which information can be input simply by positioning a detection target in a vicinity of the touch sensor without contacting the detection target with the touch sensor.

SUMMARY

A sensor system according to an embodiment of the present invention includes: a sensor module including a sensor panel arranged on a display panel; and a processor capable of driving the sensor module in a noncontact manner, wherein the processor is configured to detect a first input operation based on a detection target approaching the sensor panel, and then measure an amount of movement from a first point based on movement of the detection target in a direction away from the sensor panel after the detection target approaches the sensor panel up to the first point, and detect a second input operation based on a criterion different from the first input operation when the detection target approaches the sensor panel again after the amount of movement exceeds a threshold value.

A method for driving a sensor module including a sensor panel arranged on a display panel according to an embodiment of the present invention includes: detecting a first input operation based on an input operation approaching the sensor panel; and then measuring an amount of movement from a first point based on movement of a detection target in a direction away from the sensor panel after the detection target approaches the sensor panel up to the first point; and detecting a second input operation based on a criterion different from the first input operation when the detection target approaches the sensor panel again after the amount of movement exceeds a threshold value.

A storage medium storing a program executed by a processor of a sensor module including a sensor panel arranged on a display panel according to an embodiment of the present invention includes: detecting a first input operation based on an input operation approaching the sensor panel; and then measuring an amount of movement from a first point based on movement of a detection target in a direction away from the sensor panel after the detection target approaches the sensor panel up to the first point; and detecting a second input operation based on a criterion different from the first input operation when the detection target approaches the sensor panel again after the amount of movement exceeds a threshold value.

DESCRIPTION OF EMBODIMENTS

Figure 1:
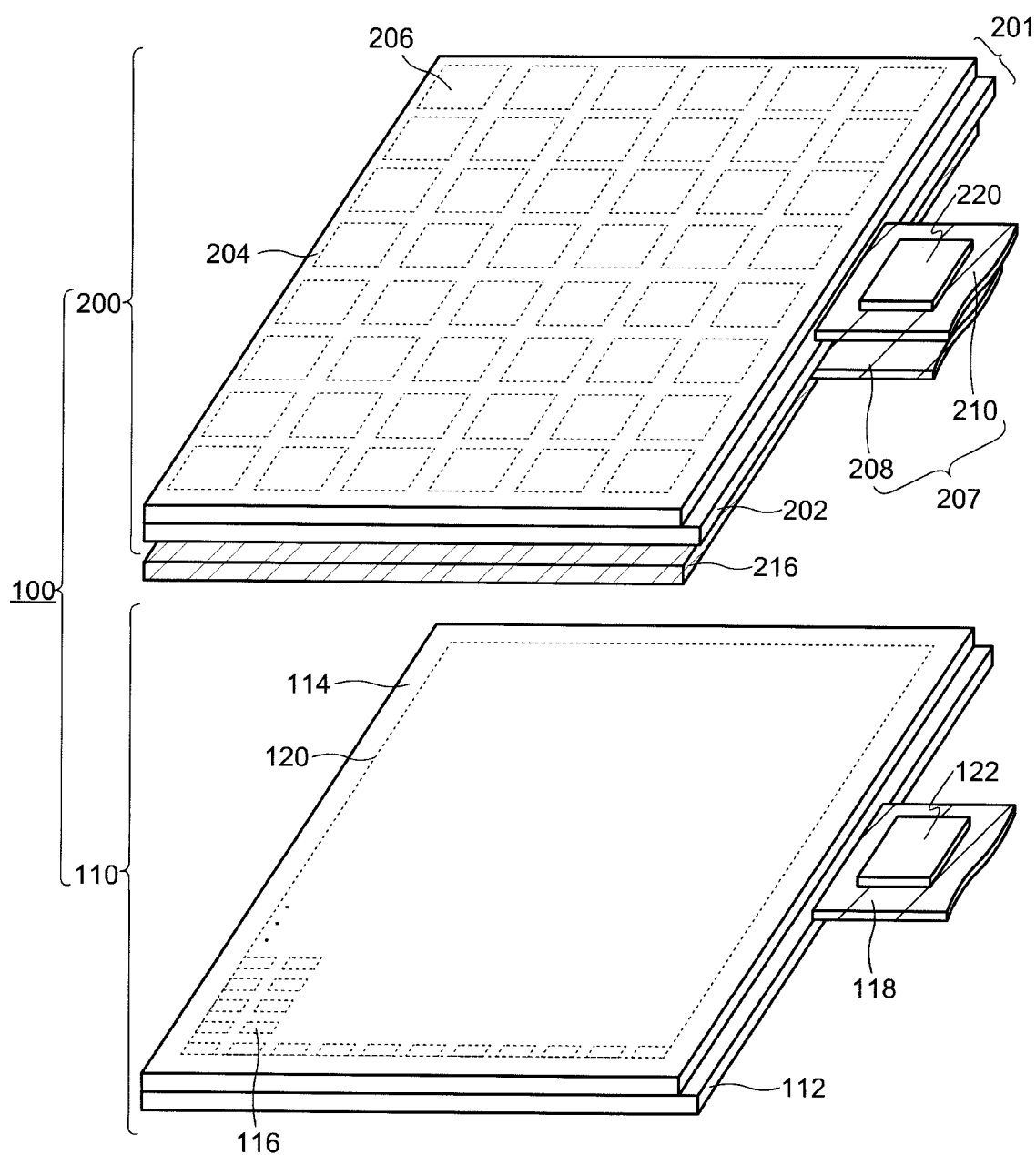
FIG. 1 is a schematic exploded perspective view of a display device included in a sensor system according to an embodiment of the present invention.

Hereinafter, each of the embodiments of the present invention will be described with reference to the drawings. The following disclosure is merely an example. A configuration that can be easily conceived by a person skilled in the art by appropriately changing the configuration of the embodiment while keeping the gist of the invention is naturally included in the scope of the present invention. For clarity of explanation, the drawings may be schematically represented with respect to widths, thicknesses, shapes, and the like of respective portions as compared with actual embodiments. However, the shown shapes are merely examples, and do not limit the interpretation of the present invention. In the present specification and the drawings, the same reference signs are given to the same components as the components described previously with respect to the drawings already shown, and detailed description thereof may be omitted as appropriate.

In each of the embodiments of the present invention, a direction from a display module 110 toward a sensor module 200 is referred to as "above" or "upper." Conversely, a direction from the sensor module 200 toward the display module 110 is referred to as "below" or "lower." As described above, for convenience of explanation, although the phrase "upper" or "lower" is used for description, for example, the vertical relationship between the display module 110 and the sensor module 200 may be arranged in a different direction from the drawing. In the following description, for example, the expression "sensor module 200 on the display module 110" merely describes the vertical relationship between the display module 110 and the sensor module 200 as described above, and other members may be arranged between the display module 110 and the sensor module 200. The term "upper" or "lower" means a stacking order in a structure in which a plurality of layers are stacked. In the case of expressing "a pixel electrode above a transistor", a positional relationship may be employed in which the transistor and the pixel electrode do not overlap each other in a plan view. On the other hand, the expression "a pixel electrode vertically above a transistor" means a positional relationship in which the transistor and the pixel electrode overlap each other in a plan view.

As used herein, the terms "film" and "layer" can optionally be interchanged with one another.

A "display device" refers to a structure that displays an image using an electro-optical layer. For example, the term display device may refer to a display panel including an electro-optical layer, or may refer to a structure in which another optical member (for example, a polarizing member, a backlight, a touch panel, or the like) is attached to a display cell. The "electro-optical layer" may include a liquid crystal layer, an electroluminescent (EL) layer, an electrochromic (EC) layer or an electrophoretic layer as long as there is no technical inconsistency. Therefore, although an embodiment to be described later will be described by exemplifying a liquid crystal display device including a liquid crystal layer and an organic EL display device including an organic EL layer as a display device, the structure of the present embodiment can be applied to a display device including another electro-optical layer described above.

As used herein, the expression "a includes A, B, or C," "a includes any of A, B, or C," and "a includes one selected from the group consisting of A, B, and C" does not exclude the case where a includes a plurality of combinations of A to C unless otherwise specified. Furthermore, these expressions do not exclude the case where a includes other elements.

In addition, the following embodiments can be combined with each other as long as there is no technical inconsistency.

An object of an embodiment of the present invention is to provide a new sensor system and a method for driving the sensor system. Alternatively, an object of an embodiment of the present invention is to provide a new sensor system including a display device and a new method for driving a sensor module in the sensor system. Alternatively, an object of an embodiment of the present invention is to provide a sensor system including a display device on which a sensor module is mounted having excellent operation capabilities from an ergonomic point of view, and a method for driving the sensor module in the sensor system. Alternatively, an object of an embodiment of the present invention is to provide a storage medium in which a program for realizing the driving method described above is stored.

1. First Embodiment

Referring to FIG. 1 to FIG. 7, a sensor system, a method for driving the sensor system, and a program for realizing the method according to an embodiment of the present invention will be described.

1-1. Sensor System

Figure 2:
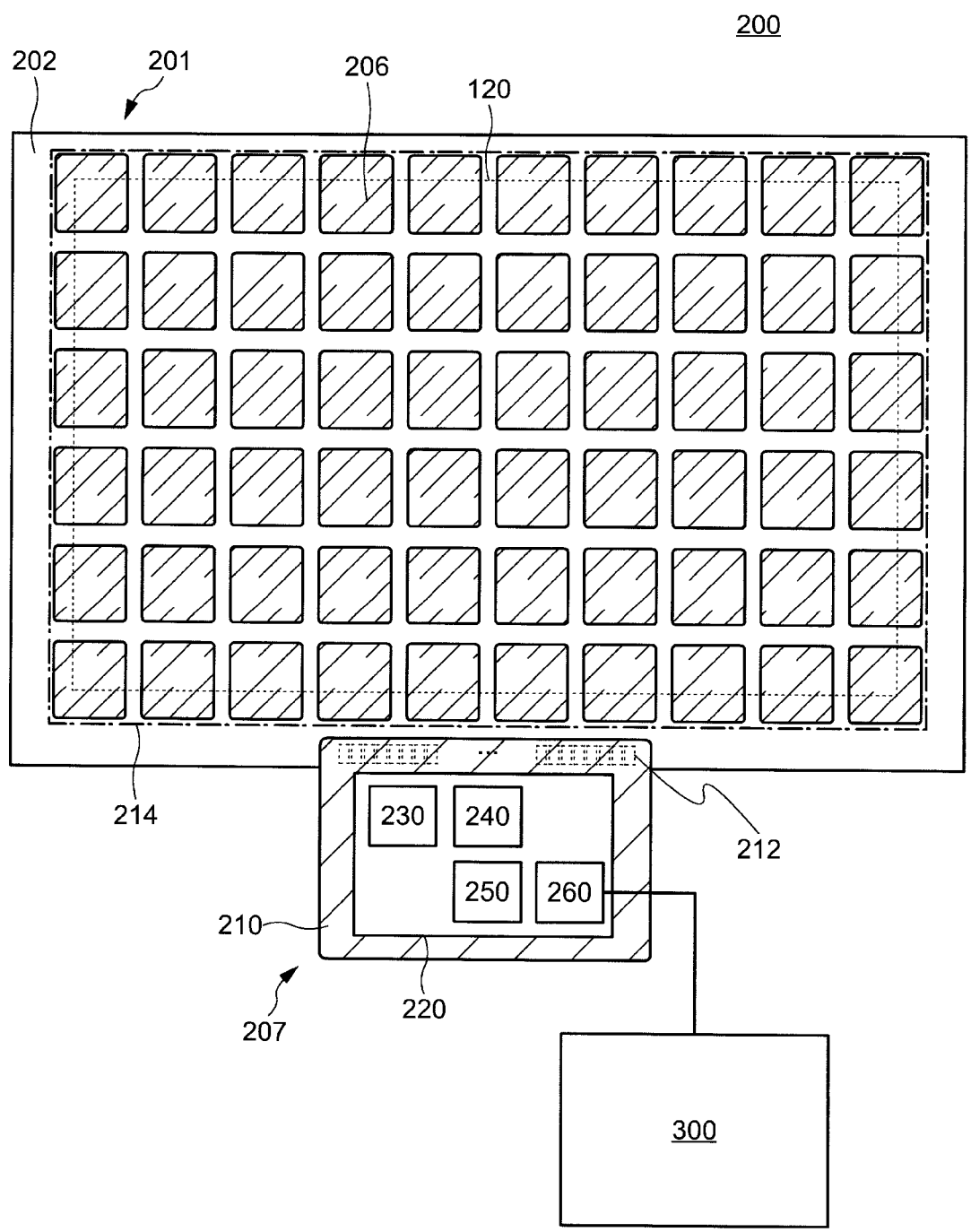
FIG. 2 is a schematic top view of a sensor module of a display device included in a sensor system according to an embodiment of the present invention.
Figure 3:
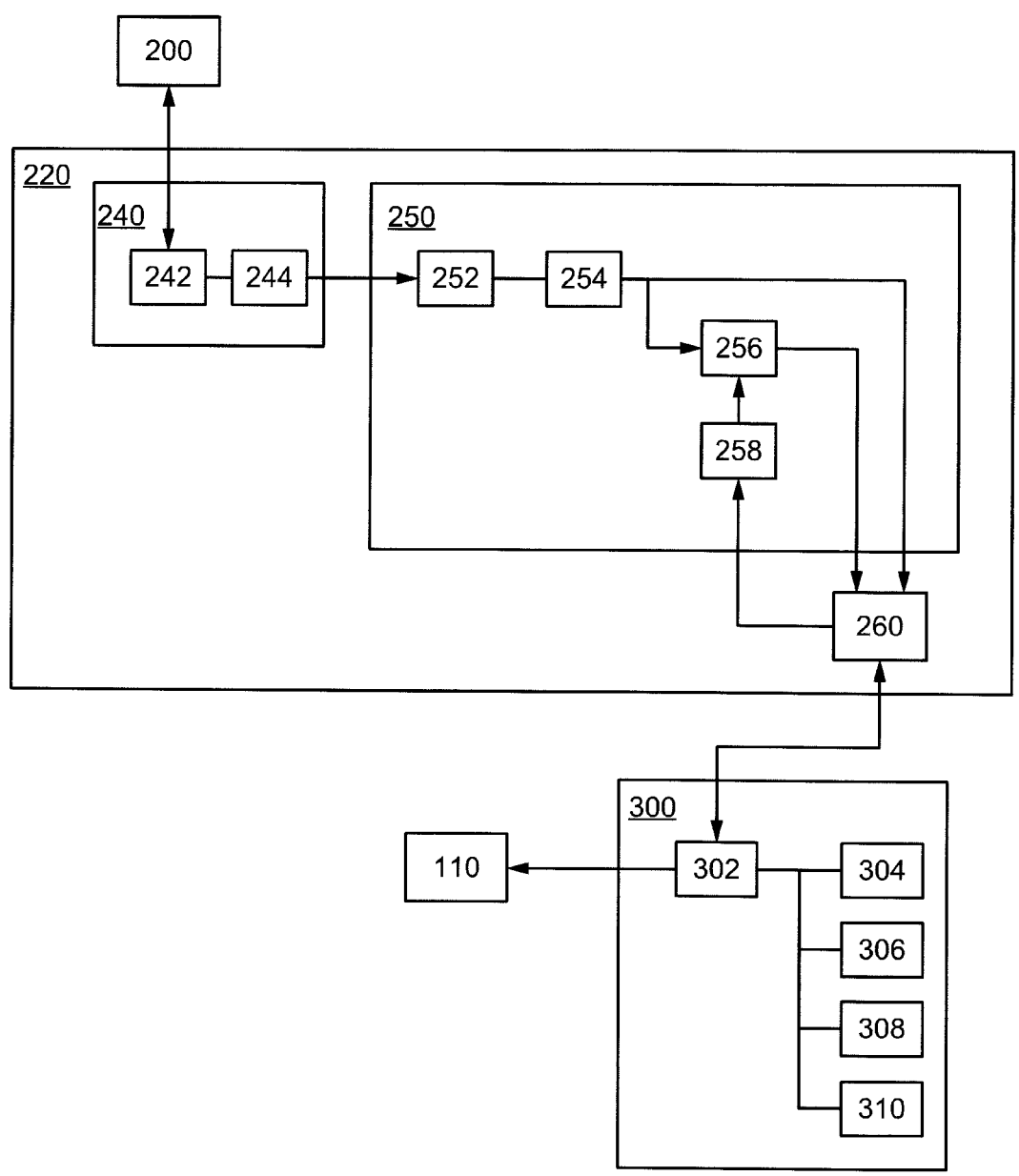
FIG. 3 is a block diagram of a sensor system according to an embodiment of the present invention.

A sensor system according to an embodiment of the present invention is shown in FIG. 1 and FIG. 2. The sensor system includes a sensor module 200 and a processor 220. In the sensor system, the sensor module 200 may be incorporated in a display device 100. In this case, the sensor system includes the display device 100 and the processor 220. The sensor system may further include the processor 220 and a computing device 300 coupled to the display device 100.

1-2. Display Device

FIG. 1 is a schematic exploded perspective view of the display device 100. The display device 100 includes a display module 110 and the sensor module 200. The sensor module 200 is arranged on the display module 110. The display module 110 and the sensor module 200 may be secured to each other by an adhesive layer not shown in FIG. 1.

1-3. Display Module

The display module 110 is a device having a function of displaying an image in accordance with instructions from the computing device 300 connected to the display module 110. The display module 110 includes an array substrate 112, a plurality of pixels 116 formed on the array substrate 112, and a counter substrate 114 covering the plurality of pixels 116 as a basic configuration. Although not shown, a driving circuit for controlling the pixel 116 is arranged on the array substrate 112. A region surrounding the plurality of pixels 116 is referred to as a display region 120. Each of the pixels 116 includes a display element and functions as a minimum unit for providing color information.

A liquid crystal element, an electroluminescent element exemplified as an inorganic electroluminescent element (LED) or an organic electroluminescent element (OLED), or the like is used as the display element. In the case where a liquid crystal element is used, a light source (backlight) which is not shown is further arranged in the display module 110. Each of the pixels 116 operates in accordance with a power and a video signal supplied from the computing device 300 via a first connector 118, such as a flexible printed circuit (FPC) board, to provide light of a particular color with a gradation based on the video signal. Video can be displayed on the display region 120 by controlling the operation of the pixel 116 based on the video signal. The plurality of pixels 116 are arranged such that an image is viewed through the sensor module 200.

A size of the display module 110 is not limited. For example, the size of the display module 110 may be a size used for a portable communication terminal called a 12.1 inch (31 cm) size or the like, may be a size suitable for a monitor, a TV, or a signage connected to a computer (for example, a size of 14.1 inches (36 cm) to 32 inches (81 cm)), and may be a larger size. More specifically, the size of the display module 110 may be sized to fit a display device incorporated into an in-vehicle display device, a cash register, or an automatic teller machine.

1-4. Sensor Module

The sensor module 200 is a device that transmits light from the display module 110 and functions as an interface for inputting information to the display device 100. The sensor module 200 is a noncontact sensor module (hover sensor). The sensor module 200 detects a detection target not only when a detection target such as a finger, a palm, or a touch pen is in direct contact with the sensor module 200 but also when the detection target approaches the sensor module 200. The sensor module 200 has a function of specifying a position (hereinafter, simply referred to as an input position) of the detection target on the sensor module 200 when the detection target is detected. A distance at which the sensor module 200 detects the detection target can be set as appropriate, for example, a range within 5 mm, within 20 mm, within 50 mm, or within 100 mm from the outermost surface of the sensor module 200. As will be described later, a threshold distance is set in the sensor system for the sensor module 200 to determine whether or not an input from the detection target.

As shown in FIG. 1 and FIG. 2, the sensor module 200 includes a sensor panel 201 and a connector unit 207 connected to the sensor panel. The sensor panel 201 is arranged on the display region 120 of the display module 110. In other words, the sensor panel 201 is arranged on the display screen. The sensor panel 201 includes a sensor substrate 202 and a cover substrate 204 facing the sensor substrate 202. Each of the sensor substrate 202 and the cover substrate 204 is an insulating substrate, and is made of a material that transmits visible light in order to visually recognize an image displayed by the display module 110. For this reason, the sensor substrate 202 and the cover substrate 204 are made of an inorganic material such as glass and quartz, or a polymer material such as polyimide, polyamide, and polycarbonate. The sensor substrate 202 and/or the cover substrate 204 may have flexibility sufficient enough to be deformed arbitrarily, or may have low flexibility so as not to be plastically deformable.

A plurality of sensor electrodes 206 are arranged between the sensor substrate 202 and the cover substrate 204. The plurality of sensor electrodes 206 are arranged in a matrix having a plurality of rows and columns. A region in which the plurality of sensor electrodes 206 are arranged is referred to as a sensor region 214. The sensor electrode 206 is arranged such that the sensor region 214 overlaps the display region 120. The number (for example, the number of rows and columns) and a size (area) of the sensor electrode 206 are appropriately set according to a size of the display device 100, detection accuracy required by the sensor module 200, and the like. For example, the number of rows and columns may be 5 or more and 10 or less and 5 or more and 15 or less, respectively. As can be understood from FIG. 1, each of the sensor electrodes 206 has a larger area than the pixel 116 and is arranged so as to overlap the plurality of pixels 116.

The sensor electrode 206 includes a transparent oxide, such as indium-tin mixed oxide (ITO) and indium-zinc mixed oxide (IZO). Alternatively, the sensor electrode 206 may comprise a metal (zero valent metal) such as titanium, molybdenum, tungsten, aluminum, and copper, or an alloy comprising one or more of these metals. In this case, in order to ensure light transmittance, the sensor electrode 206 may be formed in a mesh shape having a plurality of openings.

A sensor wiring (not shown) electrically connected to the sensor electrode 206 extends from each of the sensor electrodes 206 to one side of the sensor substrate 202, and forms a terminal 212 at an end portion of the sensor substrate 202 (FIG. 2). A second connector 210, such as a flexible printed circuit (FPC) substrate, is electrically connected to the terminal 212 (FIG. 1 and FIG. 2).

A noise shield layer 216 for shielding electrical effects from the display module 110 is arranged between the sensor substrate 202 of the sensor module 200 and the counter substrate 114 of the display module 110 (see FIG. 1). The noise shield layer 216 may include a transparent oxide such as ITO and IZO, or a metallic material. In the latter case, a mesh-like metal film having a plurality of openings is used as the noise shield layer 216 so that visible light can be transmitted. The noise shield layer 216 is arranged so as to overlap the plurality of sensor electrodes 206. A third connector 208 such as an FPC substrate is electrically connected to the noise shield layer 216, and an AC voltage having a pulse-like or sinusoidal waveform in phase with a potential applied to the sensor electrode 206 is applied thereto. Therefore, the noise shield layer 216 and the sensor electrode 206 are always equipotential.

1-5. Computing Device

The computing device 300 is an electronic device having a computing function, and is, for example, a desktop computer, a notebook personal computer, or a portable communication terminal such as a tablet and a smartphone. Alternatively, the computing device 300 may be an information processing device (for example, a microcomputer) incorporated in various apparatuses on which the display device 100 is mounted. As shown in the block diagram of FIG. 3, the computing device 300 includes a control unit 302 that controls an operation of the computing device 300, a storage unit 304, a communication unit 306 controlled by the control unit 302, an audio output unit 308, a power supply 310, and the like.

The control unit 302 includes a processing device such as a central processing unit (CPU), and executes various processes by operating a basic application program stored in the storage unit 304 and a program for realizing various driving methods. The storage unit 304 includes a volatile main storage device and a non-volatile auxiliary storage device. The main memory device may be a random access memory (RAM) or a dynamic random access memory (DRAM). The auxiliary storage device is a read only memory (ROM), a flash memory, a hard disk drive, or the like. The basic application program or programs are stored in the auxiliary storage device constituting the storage unit 304. As will be described in detail later, the storage unit 304 stores coordinates when an input operation is detected, stores coordinates when an upper vertex or a lower vertex is detected, and stores a threshold distance used for input operation determination in a step set by an instruction of the program.

The communication unit 306 has a function of communicating with an external electronic device (not shown) via a network. The audio output unit 308 is a speaker having a function of generating various sounds. The power supply 310 is a secondary battery such as a lithium-ion battery, and is supplied with electric power from an external power supply to store the electric power, and when the external power supply is unavailable, the electric power is supplied to the control unit 302, the display device 100, and the like.

Inputs to the computing device 300 can be performed using the sensor module 200. Accordingly, the display device 100 including the sensor module 200 functions as an input/output unit of the computing device 300. An input using the sensor module 200 will be described later. Although not shown, as an input device to the computing device 300, the computing device 300 may further include a keyboard, operation buttons, a mouse, and the like.

The computing device 300 is connected to the display module 110 via the first connector 118 and to the sensor module 200 via the second connector 210. A drive circuit 122 for generating a signal to be supplied to the pixel 116 is arranged on the first connector 118. The control unit 302 operates in accordance with an instruction of an application installed in the computing device 300, and a video signal is supplied to the drive circuit 122. The drive circuit 122 generates a signal to be supplied to each of the pixels 116 based on the video signal, and controls the pixels 116. As a result, an image is displayed on the display region 120 in accordance with the application. In addition, the drive circuit 122 may not be arranged on the first connector 118 but may be formed on the array substrate 112.

1-6. Processor

The second connector 210 is arranged with the processor 220 that functions as a drive circuit. The processor 220 is formed by an integrated circuit formed on a silicon semiconductor substrate. The processor 220 drives the sensor module 200 in a noncontact manner. The processor 220 is electrically connected to the display device 100 and the computing device 300. For example, the processor 220 includes a power supply circuit 230, a detector 240, an arithmetic element 250, an interface 260, and the like (see FIG. 2 and FIG. 3). In addition, the processor 220 may not be arranged on the second connector 210 but may be arranged on the sensor substrate 202.

The power supply circuit 230 converts electric power supplied from an external power supply (not shown) via the computing device 300 into a pulsed AC voltage (AC square wave), and supplies the AC voltage to each of the sensor electrodes 206 via the terminal 212 and the sensor wiring.

The detector 240 is also referred to as an analog front end (AFE: Analog Front End), and includes a signal detection unit 242 and an analog/digital conversion unit (A/D conversion unit) 244. A variation in capacitance of the sensor electrode 206 is detected as a potential variation by the signal detection unit 242, and the potential variation is digitized by the A/D conversion unit 244 and converted into a detection signal.

The arithmetic element 250 includes a signal processing unit 252, a coordinate calculation unit 254, a determination unit 256, a storage unit 258, and the like. The signal processing unit 252 performs various kinds of process on the detection signal input from the A/D converting unit 244. Examples of the process for the detection signal include known processes, and examples thereof include a noise reduction process, baseline correction, and linear conversion process. A position of the detection target on the sensor region 214 and a distance from the sensor module 200 to the detection target are calculated by the detection signal processed by the signal processing unit 252 being processed by the coordinate calculation unit 254. That is, three-dimensional coordinates of the detection target with respect to the sensor module 200 are calculated. Two-dimensional coordinates on the sensor module 200 are determined using a distribution of sensor values. The sensor value is an index indicating a potential variation in the plurality of sensor electrodes 206 in which the detection target approaches. On the other hand, the distance from the sensor module 200, which is the coordinate of the third dimension, to the detection target is determined by the intensity of the sensor value. The calculated three-dimensional coordinates are input to the computing device 300 via the interface 260. As a result, the computing device 300 can obtain the three-dimensional coordinates of the detection target.

The interface 260 is used to connect to the computing device 300 and is configured based on standards such as Universal Serial Bus (USB) and Serial Peripheral Interface (SPI). The storage unit 258 is a device including a volatile or non-volatile memory element. The storage unit 258 stores a threshold distance from the sensor module 200 to the detection target, a threshold distance from a specific point to the detection target, and a threshold resting time of the detection target at a specific point set by the computing device 300. These pieces of information are arranged from the storage unit 304 of the computing device 300 via the interface 260.

The determination unit 256 compares the various threshold distances in the three-dimensional coordinates of the detection target in contact with or close to the sensor module 200 with the distances from the sensor module 200 to the detection target. Further, in the case of determining that the distance from the sensor module 200 to the detection target is equal to or less than the threshold distance, the determination unit 256 determines that an input operation (for example, a "tap operation" or a "touch operation") by the detection target is performed even if the detection target is not in contact with the sensor module 200. Conversely, in the case of determining that the distance from the sensor module 200 to the detection target exceeds the threshold distance, the determination unit 256 determines that the input operation has not been performed. Determination results by the determination unit 256 are transmitted to the control unit 302 of the computing device 300 via the interface 260. The control unit 302 provides a video signal of a video corresponding to the input operation to the display module 110 in accordance with an instruction of a program based on the determination results.

Further, the determination unit 256 may determine that the input operation has ended and transmit this determination result to the control unit 302 of the computing device 300 when the detection target that exists within the threshold distance from the sensor module 200 exceeds the threshold distance (hereinafter, referred to as "reset distance") away from the sensor module 200. An operation in which the distance from the sensor module 200 to the detection target exceeds the reset distance is referred to as a reset operation.

Furthermore, the determination unit 256 changes a method for detecting an input operation in a period from the time when the initial input operation is detected with respect to one input region to the time when the reset operation is detected. The input operation in the period from the detection of the initial input operation to the detection of the reset operation is referred to as a "series of input operations." In this case, a method for detecting each input operation after the series of input operations is started is different from the method for detecting an input operation in another operation (for example, the initial input operation).

In the sensor system described above, the processor 220 is arranged on the second connector 210 or the sensor substrate 202. However, all or part of the processor 220 may be arranged on the computing device 300. Alternatively, all or part of the functions of the processor 220 may be realized in the computing device 300. For example, the detector 240 and/or the arithmetic element 250 may be mounted on the computing device 300. Alternatively, all or part of the functions of the detector 240 and/or the arithmetic element 250 may be realized in the computing device 300.

1-7. Problems in Conventional Sensor System

Problems in the conventional sensor system will be described.

Figure 4:
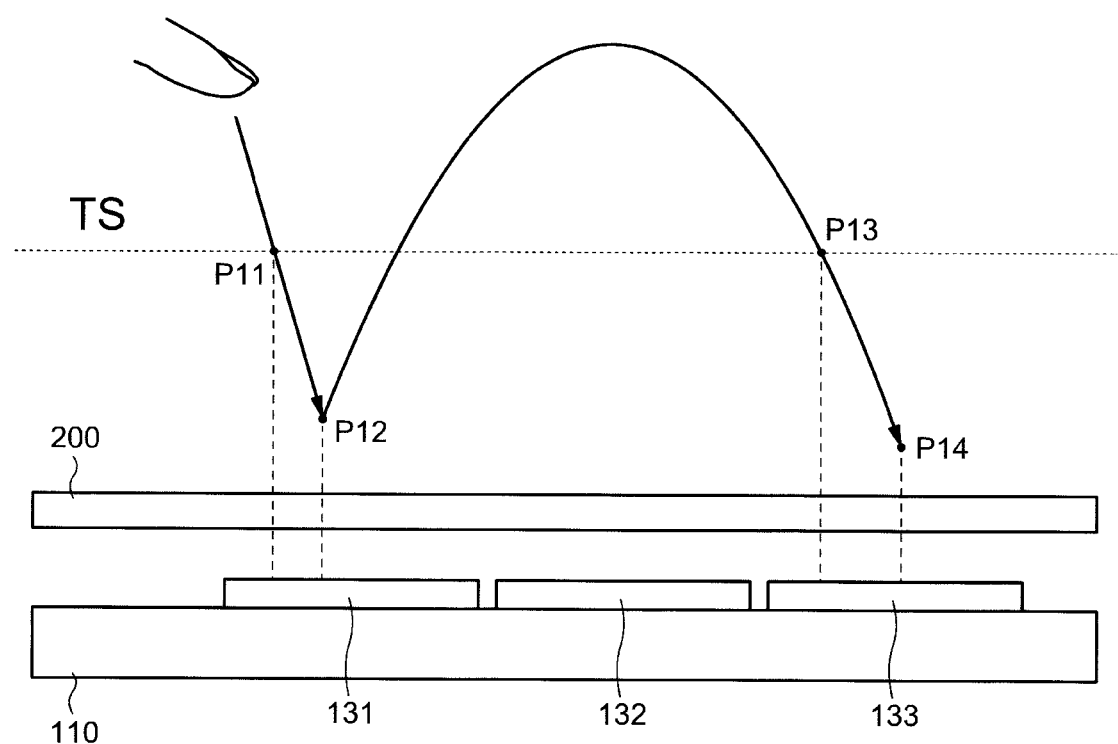
FIG. 4 is a schematic diagram showing a case where a detection target is brought close to a conventional display device with a noncontact sensor module.
Figure 5:
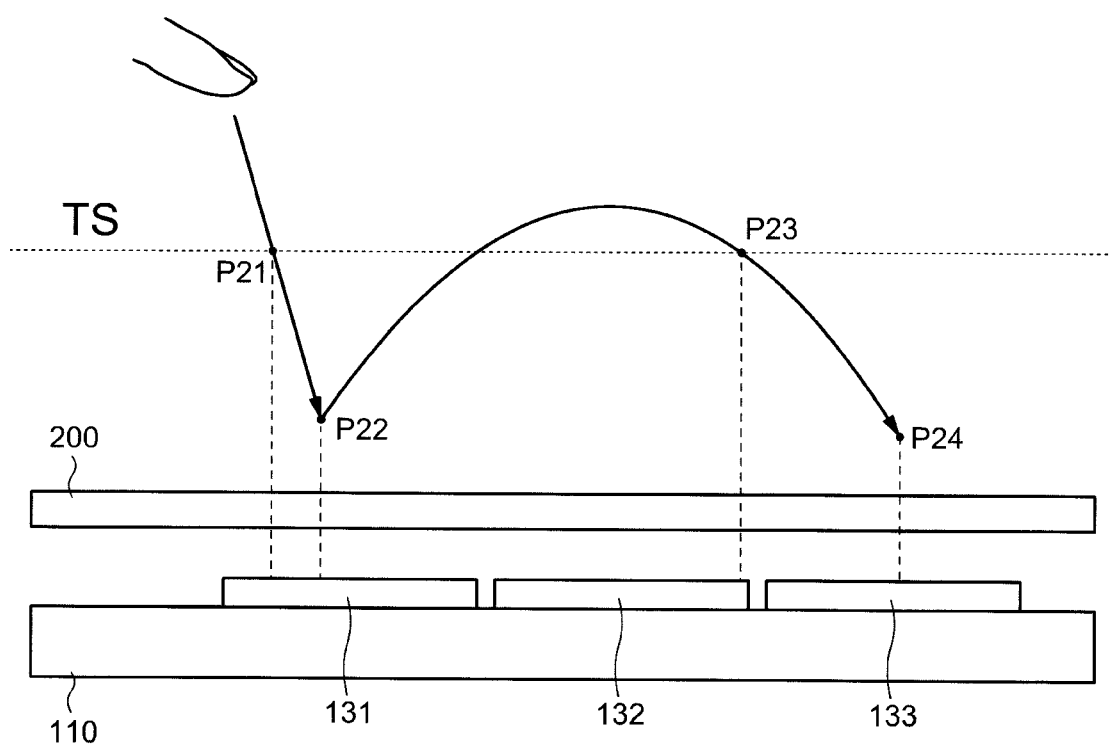
FIG. 5 is a schematic diagram showing a case where a detection target is brought close to a conventional display device with a noncontact sensor module.

FIG. 4 and FIG. 5 are schematic diagrams showing a case where a user brings a detection target such as a finger close to a conventional display device with a noncontact sensor module. In FIG. 4 and FIG. 5, target displays 131, 132, and 133 displayed by the plurality of pixels 116 are shown on the display module 110. The target displays are aligned along an x-axis. For example, the target display is a numeric keypad. The sensor module 200 is arranged at a position facing the display module 110. Members between the display module 110 and the sensor module 200 are omitted.

A dotted line displayed above the sensor module 200 (in the positive direction of a z-axis) indicates a position where a distance from the sensor module 200 (or the sensor panel 201) is an input determination distance TS. The input determination distance TS is a distance between the sensor module 200 and the detection target in a condition where the processor 220 detects that the input operation has been performed by the detection target. That is, when the distance between the sensor module 200 and the detection target exceeds the input determination distance TS, the processor 220 does not detect the input operation. On the other hand, when the distance is equal to or smaller than the input determination distance TS, the processor 220 detects the input operation. In these drawings, a solid curved arrows indicate trajectories of a tip of the detection targets.

In FIG. 4 and FIG. 5, a trajectory of the detection target with respect to the first input operation (input operation on the target display 131) is different from a trajectory of the detection target with respect to the second input operation (input operation on the target display 133). The trajectory of the detection target shown in FIG. 4 is a trajectory when the second input operation is performed after the detection target has moved to a position sufficiently away from the sensor module 200 after the first input operation. On the other hand, the trajectory of the detection target shown in FIG. 5 is a trajectory when the second input operation is performed after the first input operation without the detection target being sufficiently away from the sensor module 200.

In FIG. 4, in order to perform the input operations on the target displays 131 and 133, the user moves the detection target by aiming at points P12 and P14 using the detection target. As shown in FIG. 4, when the detection target approaches the sensor module 200 (target display 131) along the trajectory and a distance between the sensor module 200 and the detection target reaches the input determination distance TS, the processor 220 determines a position (point P11) of the detection target in the input determination distance TS as a position where the input operation is detected.

On the other hand, the detection target approaches the sensor module 200 even after the detection target reached the input determination distance TS, and moves to the input position (point P12) targeted by the user. That is, a shift (difference) occurs between the input position (point P12) recognized by the user and the position (point P11) of the input operation detected by the processor 220. When the point P11 and the point P12 are projected in two-dimensional coordinates, a distance between the two is the shift between the input position targeted by the user and the position of the input operation detected by the processor 220. When the detection target approaches the target display 131, the detection target approaches the sensor module 200 at an angle close to perpendicular to the main surface of the sensor module 200, and thus the shift between the input position targeted by the user and the position of the detected input operation is small. Accordingly, the processor 220 detects an input operation on the target display 131 as well as the aim of the user.

After moving the detection target to the point P12, the user moves the detection target upward and then moves the detection target aiming at the point P14 in order to perform the input operation on the next target display 133. In FIG. 4, the detection target has moved beyond the input determination distance TS to a position sufficiently far from the sensor module 200. Therefore, when the detection target approaches the target display 133, the detection target approaches the sensor module 200 at an angle close to perpendicular to the main surface of the sensor module 200. Consequently, the shift between a position (point P13) of the detection target in the input determination distance TS and the input position (point P14) targeted by the user is small. Accordingly, the processor 220 detects an input operation on the target display 133 as well as the aim of the user.

As shown in FIG. 4, when the detection target moves from the point P12 to the point P14 and the detection target moves to a position sufficiently away from the sensor module 200, the input operation is less likely to be erroneously recognized.

On the other hand, as shown in FIG. 5, when the second input operation is performed without the detection target being sufficiently away from the sensor module 200 after the first input operation, the detection target approaches the sensor module 200 at an angle close to the horizontal with respect to the main surface of the sensor module 200 when the detection target approaches the target display 133. Consequently, a shift between a position (point P23) of the detection target in the input determination distance TS and an input position (point P24) targeted by the user is larger than the shift between the point P13 and the point P14 in FIG. 4. Therefore, despite the aim of the user being the target display 133, the processor 220 detects an input operation on the target display 132 next to the target display 133. Points P21 and P22 in FIG. 5 are the same as the points P11 and P12 in FIG. 4.

As shown in FIG. 5, when the detection target moves from the point P22 to the point P24 without moving the detection target sufficiently away from the sensor module 200, the input operation is likely to be erroneously recognized.

1-8. Detection Operation of Sensor System

Figure 6:
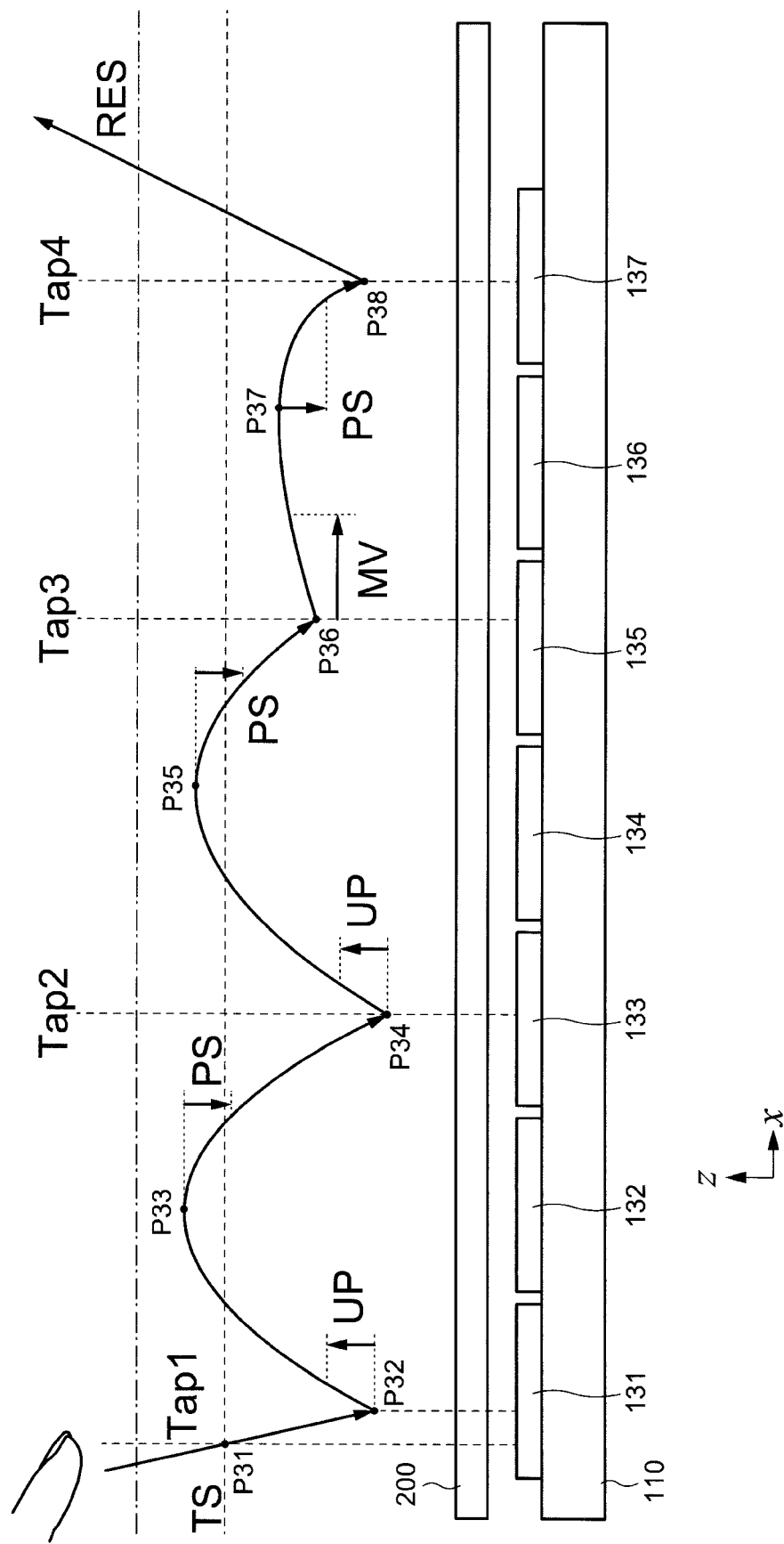
FIG. 6 is a schematic cross-sectional view showing a detection operation of a sensor system according to an embodiment of the present invention.

Hereinafter, a detection operation of the sensor system having the configuration described above will be described. FIG. 6 is a schematic cross-sectional view showing the detection operation of the sensor system according to the present embodiment. In FIG. 6, target displays 131 to 137 displayed by the plurality of pixels 116 (FIG. 1) are shown on the display module 110. The target display is, for example, a numeric keypad. The sensor module 200 is provided at a position facing the display module 110. A member between the display module 110 and the sensor module 200 is omitted.

As in FIG. 4 and FIG. 5, the input determination distance TS is indicated by a dotted line above the sensor module 200. The input determination distance TS is a reference for detecting the first input operation in the series of input operations. A reset determination distance RES is indicated by a dashed-dotted line above the input determination distance TS. The reset determination distance RES is a distance between the sensor module 200 (or the sensor panel 201) and the detection target when the processor 220 detects that a reset operation indicating that the series of input operations by the detection target is ended has been performed.

When the detection target reaches the input determination distance TS, the first input operation Tap1 is detected, and the series of input operations is started. When the series of input operations is started, the detection of the input operation based on the input determination distance TS is disabled, and the input operation is detected in a manner described below. When a distance between the sensor module 200 and the detection target is equal to or smaller than the reset determination distance RES after the series of input operations is started, the processor 220 determines that the series of input operations is continued. On the other hand, when the distance exceeds the reset determination distance RES, the processor 220 detects a reset operation and determines that the series of input operations has ended. In FIG. 6, a position where the processor 220 detects the input operation is indicated by Tap1 to Tap4.

In other words, when the distance from the sensor module 200 to the detection target reaches the reset determination distance RES after detecting the first input operation (Tap1), which is a trigger for starting a series of input operations, the processor 220 determines that the series of input operations has ended. Therefore, a timing at which the processor 220 detects the next input operation is when the distance from the sensor module 200 to the detection target reaches the input determination distance TS.

As shown in FIG. 6, first, the user moves the detection target toward the target display 131 in order to execute an input operation to the target display 131. In this case, when the detection target approaches the target display 131 and a distance between the sensor module 200 and the detection target reaches the input determination distance TS, the processor 220 determines a position (point P31) of the detection target in the input determination distance TS as a position where the input operation Tap1 is detected. Since the input determination distance TS cannot be viewed or the like, the user usually brings the detection target closer to the sensor module 200 than the input determination distance TS. That is, the detection target approaches the sensor module 200 even after the detection target reached the input determination distance TS, and moves to, for example, an input position (point P32).

Thereafter, the user moves the detection target toward the target display 133 in order to perform an input operation to the next target display 133. In this case, the detection target moves in a direction away from the sensor module 200 (in the positive direction of the z-axis) with respect to the point P32, and then moves toward the next target display 133. That is, with the point P32 as a vertex, the direction of movement of the detection target greatly changes in a direction away from the sensor module from a direction approaching the sensor module. Hereinafter, a point at which the trajectory of the detection target changes from the approach direction to the sensor panel to the separation direction is referred to as a lower vertex.

The point P32 described above may be referred to as a "first point." The input operation Tap1 in the point P31 may be referred to as a "first input operation." In other words, the first input operation is detected at the point P31 based on the fact that the detection target approaches the sensor module 200. Thereafter, when the detection target moves away from the sensor module 200 after approaching the sensor module 200 to the first point (point P32), it can be said that the lower vertex exists in the trajectory of the detection target.

When the lower vertex (point P32) is detected in the trajectory of the detection target, the processor 220 measures an amount of movement that the detection target has moved from the lower vertex. As will be described later, the movement amount may be a vertical movement amount UP in a direction (in the positive direction of the z-axis) away from the sensor module 200 with respect to the lower vertex, or may be a horizontal movement amount MV in a direction (in the positive direction or negative direction of the x-axis) parallel to the main surface of the sensor module 200 with respect to the lower vertex. When the movement amount measured in this way exceeds a preset threshold value, the processor 220 enters a standby state in which the next input operation can be detected.

After moving the detection target upward from the point P32, the user moves the detection target toward the target display 133 in order to perform an input operation to the target display 133. In this case, since the detection target moves away from the sensor module 200 with respect to the point P32 and then approaches the sensor module 200, an upper vertex P33 exists in the trajectory of the detection target. When the upper vertex P33 is detected in the trajectory of the detection target, the processor 220 measures a vertical movement amount PS in a direction in which the detection target approaches the sensor module 200 with respect to the upper vertex P33. When the measured vertical movement amount PS exceeds a predetermined threshold value, the processor 220 determines that the next input operation has been started. A position of the upper vertex P33 may be lower or higher than the input determination distance TS. However, the position of the upper vertex P33 is lower than the resetting determination distance RES.

That is, in a series of input operations, the processor 220
(1) detects the lower vertex (point P32), and
(2) when a first movement amount from the lower vertex is measured based on the detection target moving in a direction away from the sensor module 200 with respect to the lower vertex, and it is detected that the first movement amount exceeds a threshold value,
the processor 220 enters the standby state in which the next input operation can be detected.

Further, after (2) described above, the processor 220 during the series of input operations
(3) detects that the detection target has reached the upper vertex P33, and
(4) when the detection target moves in a direction approaching the sensor module 200 with respect to the upper vertex P33, a second movement amount from the upper vertex P33 is measured, and when it is detected that the second movement amount exceeds the threshold value,
the processor 220 determines that the next input operation has started.

In the above embodiment, the first movement amount is the vertical movement amount UP. However, the first movement amount is not limited to the vertical movement amount UP. For example, the first movement amount may be the horizontal movement amount MV described later. The second movement amount is the vertical movement amount PS.

In other words, with respect to (1) and (2) described above, the processor 220 can detect a next input operation based on a criterion that differs from the initial input operation, based on an operation in which the detection target approaches the sensor module 200 again after the vertical movement amount UP of the detection target with respect to the point P32 exceeds the threshold value.

In other words, with respect to (3) and (4) described above, the processor 220 can detect the upper vertex P33 at which the detection target is at the farthest point from the sensor module 200 between detection of the input operation Tap1 and detection of the input operation Tap2 in FIG. 6, and detect the next input operation when the detection target moves beyond the threshold value from the upper vertex P33 toward the sensor module 200.

Next, a method for detecting an input operation on a detection target moving toward the target display 133 will be described. The detected object moves to an input position (point P34) targeted by the user by the operation of the user. Thereafter, the detection target moves from the point P34 toward the next target display 135.

The point P34 described above may be referred to as a "second point." The input operation Tap2 in the point P34 may be referred to as a "second input operation." In other words, it can be said that the processor 220 detects the second input operation (Tap2) when the detection target is moved from the second point after approaching the sensor module 200 to the second point (point P34). In this embodiment, when the detection target is moved away from the sensor module 200 with respect to the second point (point P34), the processor 220 detects the second input operation (Tap2). That is, the point P34 is a lower vertex in the trajectory of the detection target. When the lower vertex (point P34) is detected, the processor 220 measures an amount of movement that the detection target has moved from the lower vertex. As described above, the movement amount may be the vertical movement amount UP in the positive direction of the z-axis with respect to the lower vertex, or may be the horizontal movement amount MV on the x-axis with respect to the lower vertex.

After moving the detection target to the point P34, the user moves the detection target upward from the point P34 in order to perform an operation of inputting the object to the next target display 135. After moving the detection target to an upper vertex P35, the user moves the detection target toward the target display 135 in order to perform an input operation to the target display 135. In this case, the processor 220 detects the next input operation with respect to the detection target moving toward the target display 135 after detecting the input operation to the target display 133. A position of the upper vertex P35 may be lower or higher than the input determination distance TS. However, the position of the upper vertex P35 is lower than the reset determination distance RES.

Since operations from the point P34 to a point P36 are the same as the operation from the point P32 to the point P34, the explanation will be omitted. After moving the detection target to the point P36, the user moves the detection target from the point P36 to a side in order to perform an operation of inputting the object to the next target display 137. After the detection target reaches the upper vertex P37, the user moves the detection target laterally toward the target display 137 in order to perform an input operation on the target display 137.

Movement of the detection target from the point P36 toward the upper vertex P37 exhibits a behavior that differs from movement of the detection target from the point P34 toward the upper vertex P35. Specifically, when the detection target moves from the point P36 toward the next target display 137, the vertical movement amount UP of the detection target does not exceed the threshold value. In this case, the processor 220 detects the input operation when the horizontal movement amount MV on the x-axis that moves parallel to the main surface of the sensor module 200 with respect to the point P36 as the lower vertex exceeds the threshold value.

The point P36 described above may be referred to as a "third point." The input operation Tap3 in the point P36 may be referred to as a "third input operation." The processor 220 detects the third input operation (Tap3) when the detection target is moved from the third point after approaching the sensor module 200 to the third point (point P36). That is, the point P36 is a lower vertex in the trajectory of the detection target. When the lower vertex (point P36) is detected, the processor 220 measures the horizontal movement amount MV in which the detection target has moved along the x-axis with respect to the lower vertex.

After detecting the input operation Tap3 to the target display 135, the processor 220 enters a standby mode in which the next input operation can be detected when the horizontal movement amount MV on the x-axis with respect to the point P36 exceeds the threshold value. When the upper vertex P37 is detected in the trajectory of the detection target, the processor 220 measures the vertical movement amount PS in which the detection target approaches the sensor module 200 with respect to the upper vertex P37. When the measured vertical movement amount PS exceeds the threshold value, the processor 220 determines that the next input operation has been started. The position of the upper vertex P37 is lower than the input determination distance TS and the reset determination distance RES.

Thereafter, the detection target moves upward from a point P38 and exceeds the reset determination distance RES. The series of input operations described above ends by the detection target exceeding the reset determination distance RES.

In other words, if a distance from the sensor module 200 to the detection target reaches the reset determination distance RES after detecting the second or later input operations (for example, Tap2) in the series of input operations, the processor 220 determines that the series of input operations has ended. Therefore, after the detection target exceeds the reset determination distance RES and is away from the sensor module 200, a timing at which the processor 220 starts the next input operation (the next series of input operations) is when the distance from the sensor module 200 to the detection target later reaches the input determination distance TS again.

1-9. Driving Flowchart of Sensor System

Figure 7:
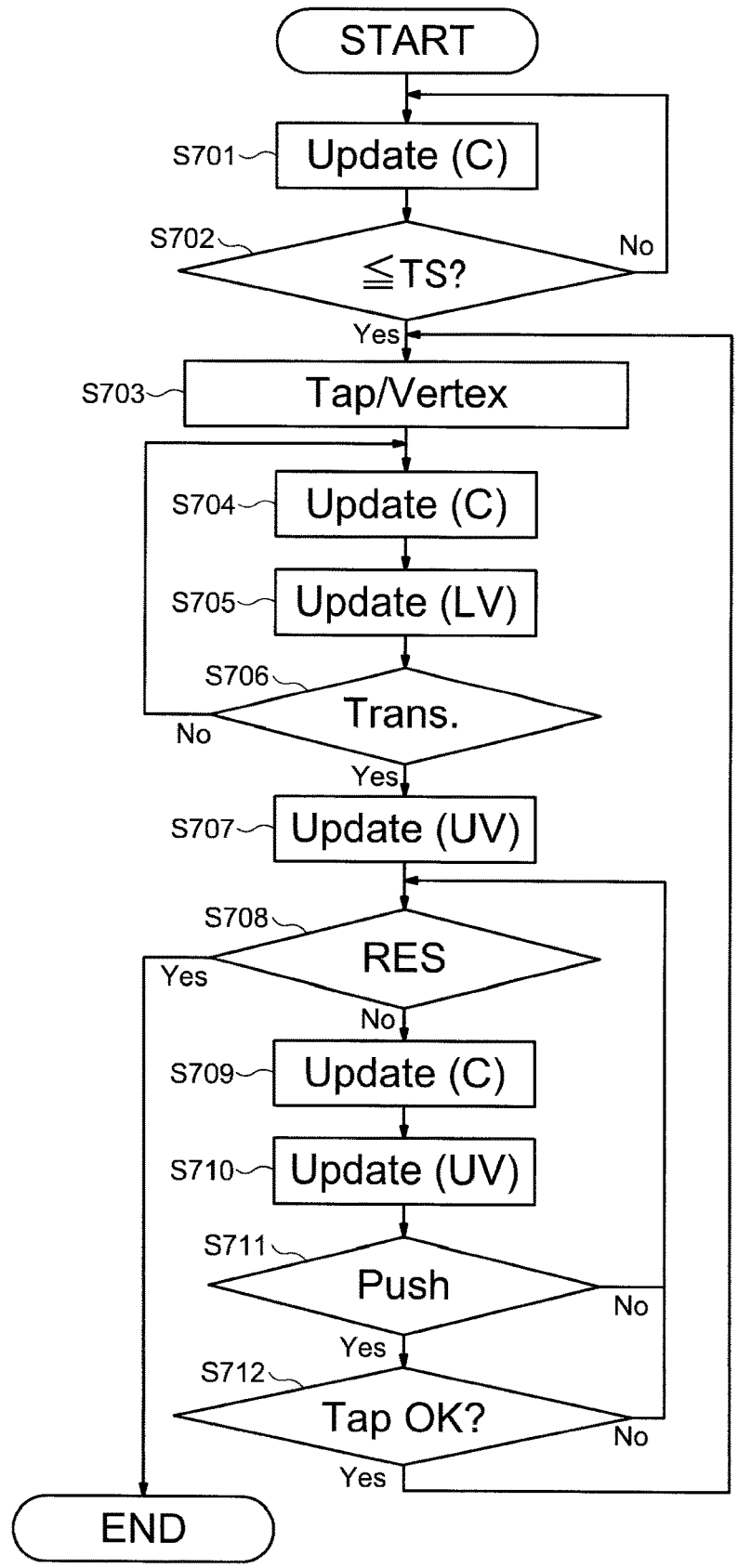
FIG. 7 is a flowchart showing a detection operation of a sensor system according to an embodiment of the present invention.

FIG. 7 is a flowchart showing a detection operation of the sensor system according to the embodiment of the present invention. The operations shown in FIG. 7 are mainly executed by the processor 220.

When the operation of the sensor system is started, the sensor module 200 and the processor 220 cooperate to detect a position of the detection target, and the processor 220 updates coordinates of the position to the latest position (S701; Update (C)).

The processor 220 compares a distance from the sensor module 200 to the detection target and the input determination distance TS based on the latest position coordinates (S702; ≤ TS?). In the step S702, if the distance between the sensor module 200 and the detection target is still greater than the input determination distance TS ("No" in S702), the processor 220 continues to update the position coordinates of the detection target (S701). The processor 220 compares the distance from the sensor module 200 to the detection target and the input determination distance TS based on the updated position coordinates (S702). On the other hand, when the distance is equal to or smaller than the input determination distance TS ("Yes" in S702), the processor 220 determines that the input operation Tap1 has been detected (S703; Tap/Vertex). When the input operation Tap1 is detected, the processor 220 determines that a series of input operations has been started.

That is, the processor 220 determines the presence or absence of the input operation based on the distance between the input determination distance TS and the detection target, using the input determination distance TS as an absolute criterion for the first input operation.

In the step S703, the processor 220 recognizes that the input operation Tap1 has been performed, and stores the coordinates in which the input operation Tap1 has been recognized as the lower vertex. The processor 220 continues to update the latest coordinates of the detection target even after the input operation Tap1 (S704; Update (C)). The processor 220 updates and stores the lower vertices each time the detected object approaches the sensor module 200 (S705; Update (LV)).

Following the step S705, the processor 220 makes a transition determination (S706; Trans.). Specifically, the processor 220 determines whether a vertical movement amount or a horizontal movement amount of the detection target with respect to the lower vertex is equal to or greater than a threshold value by the transition determination. When the vertical movement amount or the horizontal movement amount is equal to or larger than the threshold value in the step S706 ("Yes" in S706), the processor 220 enters the standby state in which the next input operation can be detected, and proceeds to a next step S707. On the other hand, if the vertical movement amount or the horizontal movement amount is less than the threshold value in the step S706 ("No" in S706), the process returns to the step S704.

More specifically, the vertical movement amount is an amount moved in a +Z direction from the coordinates of the detection target at the lower vertex. For example, when the threshold of the vertical movement amount is 5 mm, the transition determination in the step S706 is performed by determining whether the detection target has moved between frames in the +Z direction by 5 mm or more. That is, when a coordinate of the lower vertex in the Z direction in a certain frame is Z1 and a coordinate of the detection target in the Z direction in the next frame is Z2 (=Z1+6 mm), it is determined that the vertical movement amount of the detection target is equal to or larger than the threshold. Alternatively, it may be determined whether the vertical movement amount of the detection target is equal to or greater than the threshold value by reversing whether a sum of movement amounts of the detection target in the +Z direction between a plurality of consecutive frames is equal to or greater than Z1+5 mm.

On the other hand, when a coordinate of the lower vertex in a certain frame in the Z direction is Z1 and a coordinate of the detection target in the next frame in the Z direction is Z2 (=Z1+3 mm), since the vertical movement amount of the detection target is less than the threshold value, the determination in the step S706 is No, and the processor 220 returns to the step S704. Then, the coordinates of the detection target are updated. When a coordinate in the Z direction of the detection target in the next frame is Z3 (=Z2+3 mm), it is determined that the vertical movement amount of the detection target is equal to or larger than the threshold value because the coordinate in the Z direction is Z3=Z2+3 mm =Z1+6 mm.

As described above, when the movement amount of the detection target in the +Z direction exceeds the threshold value of the vertical movement amount after the lower vertex is determined, that is, when the coordinates of the detection target are equal to or larger than a sum of the lower vertex and the threshold value of the vertical movement amount after the lower vertex is determined, the processor 220 proceeds to the next step S707. When the detection target is further close to the sensor module 200 after defining a certain lower vertex, the lower vertex is updated (S704 and S705).

The horizontal movement amount is also the same as described above. In the step S706 described above, although the processor 220 determines whether the vertical movement amount or the horizontal movement amount of the detection target with respect to the lower vertex is equal to or greater than the threshold value, the processor 220 may determine whether both the vertical movement amount and the horizontal movement amount are equal to or greater than the threshold value. In this case, a range of the threshold values of the vertical movement amount and the horizontal movement amount is arbitrarily determined. For example, the threshold value of the horizontal movement amount may be set to a value larger than the threshold value of the vertical movement amount. More specifically, the threshold value of the vertical movement amount may be 5 mm, and the threshold value of the horizontal movement amount may be 25 mm. As a result, it is possible to provide a certain amount of margin for the horizontal movement amount while strictly determining the vertical movement amount. In this case, for example, it is possible to allow the detection target to shake in the horizontal direction. On the other hand, the threshold value of the vertical movement amount may be set to a value larger than the threshold value of the horizontal movement amount. More specifically, the threshold value of the vertical movement amount can be set as 10 mm, and the threshold value of the horizontal movement amount can be set as 5 mm. In this case, for example, it is possible to allow the detection target to shake in the vertical direction.

Following the step S706, when the processor 220 detects the presence of the upper vertex in the trajectory of the detection target based on the coordinates of the detection target, the processor 220 updates coordinates of the upper vertex (S707; Update (UV)). Following the step S707, the processor 220 performs a reset determination based on the coordinates of the detection target (S708; RES). In the reset determination of the step S708, when a distance between the sensor module 200 and the detection target exceeds the reset determination distance RES ("Yes" in S708), the processor 220 determines that the reset operation has been performed, and ends a series of input operations. On the other hand, in the reset determination of the step S708, when the distance between the sensor module 200 and the detection target does not exceed the reset determination distance RES ("No" in S708), the processor 220 continues the series of input operations.

Following the step S708, the sensor module 200 detects a position of the detection target and the processor 220 updates a coordinate of the position and the coordinates of the upper vertex recorded in the step S707 (S709; Update (C) and S710; Update (UV)).

Following the step S710, the processor 220 performs a push-in determination (S711; Push). Specifically, the processor 220 determines whether the vertical movement amount of the detection target with respect to the upper vertex is equal to or greater than a threshold value. If the vertical movement amount is greater than or equal to the threshold in the step S711 ("Yes" in S711), the processor 220 determines that the next input operation has been started, and proceeds to a next step S712. On the other hand, if the vertical movement amount is less than the threshold in the step S711 ("No" in S711), the processor 220 returns to step S708. A specific determination method for the vertical movement of the detection target in the step S711 is substantially the same as that in the step S706.

Following the step S711, the processor 220 determines whether the trajectory of the detection target after the step S711 satisfies Tap conditions (S712; Tap OK?). In the present embodiment, the Tap condition is whether a lower vertex exists in the trajectory of the detection target after the step S711. More specifically, when Yes is determined in the step S711, the trajectory of the detection target is a trajectory in a state of being close to the sensor module 200. Therefore, in the step S712, it is determined whether the vertical movement amount of the detection target is equal to or larger than the threshold value (for example, 3 mm) of the predetermined vertical movement amount in the +Z direction after the step S711, or whether the movement of the detection target has shifted from an approach state to the sensor module 200 to a separation state from the sensor module 200.

The threshold value of the vertical movement amount is preferably smaller than the threshold value of the vertical movement amount in the step S706. As a determination criterion in the step S712, the threshold value of the horizontal movement amount may be used instead of the threshold value of the vertical movement amount, or both of them may be used. In the step S712, when the processor 220 determines that the trajectory of the detection target satisfies the Tap conditions ("Yes" in S712), the process returns to step S703, and thereafter, the determinations of the steps S703 to S712 are repeated until it is determined that the trajectory is Yes in the step S708. On the other hand, the processor 220 returns to S708 when, for example, the input operation Tap2 is not detected in a predetermined period ("No" in S712).

The Tap conditions in the step S712 are not determined based only on the distance between the sensor module and the detection target, as is the case with the determination in the step S702. The processor 220 determines whether the Tap condition is satisfied based on the movement of the detection target itself, that is, a relative positional relationship between the detection target at a certain time and another time.

As will be described later, conditions other than the above may be set as the Tap conditions in the step S712.

As described above, according to the present embodiment, it is possible to provide the novel sensor system described above and its driving method. In particular, a novel method for driving a sensor module in a sensor system using a noncontact sensor module can be provided. As a result, even when a continuous input operation is performed without the detection target being largely separated from the sensor module 200, each input operation can be detected at an accurate position.

1-10. Program

The program according to the embodiment of the present invention is a program for realizing the method for driving the display device 100 in the sensor system described above. The program is configured to cause the control unit 302 of the computing device 300 to execute the series of operations described above. The program is configured to cause the control unit 302 to provide a video signal for displaying video for assisting an input by a user, that is, video including an input region and video corresponding to the operation on the input region to the display module 110. The program is configured to cause the control unit 302 to set a threshold value for the processor 220 to detect a lower vertex and an upper vertex, and detect an input operation based on the threshold value. Further, the program is configured to cause the control unit 302 to acquire two-dimensional coordinates or three-dimensional coordinates of the detection target from the processor 220.

The program may be distributed in a state of being stored in a medium readable by the computing device 300, or may be distributed in a state of being downloadable from a network such as the Internet via the communication unit 306. Therefore, a recording medium in which the program is stored is also included in the embodiment of the present invention.

2. Second Embodiment

Figure 8:
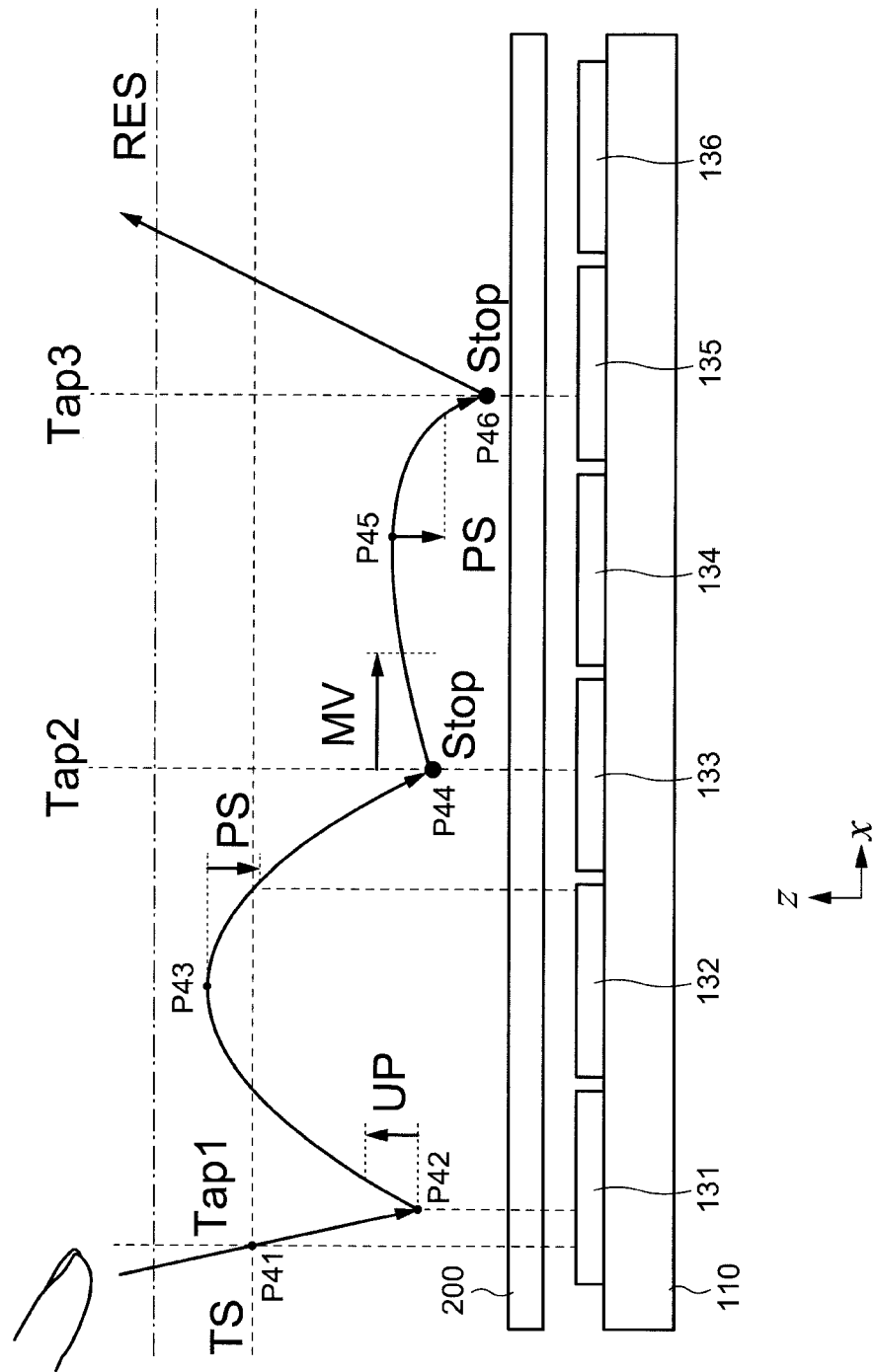
FIG. 8 is a schematic cross-sectional view showing a detection operation of the sensor system according to the embodiment of the present invention.

Referring to FIG. 8, a sensor system, which is one embodiment of the present invention, a method for detecting a detection target by the sensor system, and a program for implementing the method will be described.

2-1. Detection Operation of Sensor System

Hereinafter, a detection operation of the sensor system having the configuration described above will be described.

FIG. 8 is a schematic cross-sectional view showing a detection operation of the sensor system according to the present embodiment. In FIG. 8, target displays 131 to 136 displayed by the plurality of pixels 116 (FIG. 1) are shown on the display module 110. In FIG. 8, members denoted by the same reference signs as those shown in FIG. 6 have the same configuration and function as the members shown in FIG. 6. In FIG. 8, detection operations from a point P41 to a point P44 are the same as the detection operations from the point P31 to the point P34 in FIG. 6.

Hereinafter, a method for detecting an input operation on a detection target moving toward the target display 133 will be described. That is, in the following description, Tap conditions in the step S712 in FIG. 7 of the first embodiment are conditions that differ from the first embodiment. In the present embodiment, the detection target moves to the input position (point P44) targeted by the user in order to execute the input operation to the target display 133 by the user's operation, and stops at the point P44.

The point P44 described above may be referred to as a "second point." The input operation Tap2 in the point P44 may be referred to as a "second input operation." In other words, the processor 220 detects the second input operation (Tap2) when the detection target is at the second point (point P44) for a period exceeding the threshold values. Alternatively, the processor 220 sets the stationary period of the detection target as the Tap condition in the step S712, and determines whether the detection target is stationary for a predetermined time at the second point (point P44) (S712). More specifically, after detecting the second point (point P44), the processor 220 measures an amount of movement and a duration of movement of the detection target from the second point. The processor 220 can determine that the detection target has stopped, for example, when the detection target stays within a range of 3 mm for 0.5 seconds or more in the X direction, the Y direction, and the Z direction from the second point. However, the condition that the processor 220 determines that the detection target has stopped is not limited to the above condition, and the threshold value of the distance may be different in the X direction, the Y direction, and the Z direction. The measurement of the duration may actually measure the duration, or may be calculated by frame integration.

After stopping the detection target at the point P44, the user largely moves the detection target horizontally or upward (in a direction away from the sensor module), or both horizontally and upward (that is, obliquely upward) from the point P44 in order to perform an input operation to the next target display 135. Here, after the processor 220 detects the input operation Tap2 to the target display 133, if the horizontal movement amount MV on the x-axis with respect to the point P44 exceeds the threshold value, the processor enters the standby state in which the next input operation can be accepted (step S706 in FIG. 7). In the present embodiment, although a configuration in which the processor 220 is in the standby state based on the horizontal movement amount MV has been exemplified, the configuration is not limited to this configuration. The processor 220 may be configured to be in the standby state based on the vertical movement amount UP with respect to the point P44.

After moving the detection target to a vertex P45, the user moves the detection target toward the target display 135 in order to perform an input operation to the target display 135.

Since the operations from the point P45 to a point P46 are the same as the operations from the point P33 to the point P34 in FIG. 6, or the same as the processes from the step S707 to the step S711 in FIG. 7 in the processor 220, the explanation will be omitted.

The user moves the detection target upward in order to terminate the series of input operations after the detection target has stopped at the point P46. The processor 220 detects the third input operation (Tap3) when the detection target is at a third point (point P46) for a duration exceeding the threshold (steps S712 and S703 in FIG. 7). The processor 220 terminates the series of input operations described above by the detection target exceeding the reset determination distance RES (S703 to S708).

As described above, according to the present embodiment, the same effects as those of the first embodiment can be obtained.

3. Third Embodiment

Figure 9:
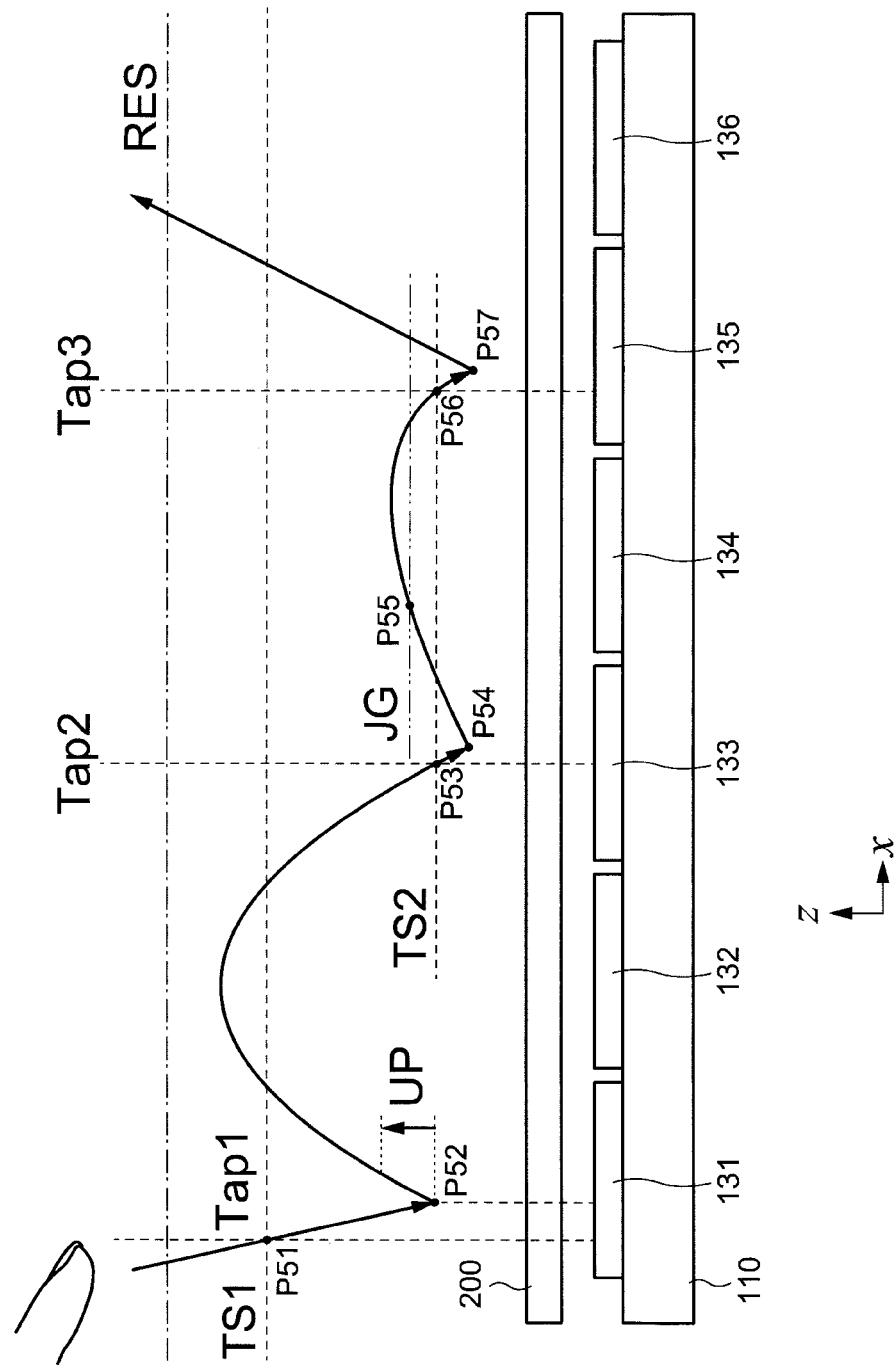
FIG. 9 is a schematic cross-sectional view showing a detection operation of the sensor system according to the embodiment of the present invention.

Referring to FIG. 9, a sensor system according to an embodiment of the present invention, a method for detecting a detection target by the sensor system, and a program for implementing the method will be described.

3-1. Sensor System Detection Operation

Hereinafter, a detection operation of the sensor system having the configuration described above will be described.

FIG. 9 is a schematic cross-sectional view showing the detection operation of the sensor system according to the present embodiment. In FIG. 9, the target displays 131 to 136 displayed by the plurality of pixels 116 are shown on the display module 110. In FIG. 9, members denoted by the same reference signs as those shown in FIG. 6 have the same configuration and function as the members shown in FIG. 6.

In FIG. 9, a first input determination distance TS1 and a second input determination distance TS2 are indicated by dotted lines above the sensor module 200. A determination start distance JG is indicated by a two-dot chain line below the first input determination distance TS1 and above the second input determination distance TS2. The reset determination distance RES is indicated by a dashed-dotted line above the first input determination distance TS1. The first input determination distance TS1 is a reference for detecting a first input operation in a series of input operations. The second input determination distance TS2 is a reference for detecting an n-th or later input operations in the series of input operations (n is a natural number equal to or greater than 2). The determination start distance JG is a reference for the processor 220 to enter the standby state in which the next input operation can be detected after the n-th or later input operations are detected in the series of input operations. That is, in the following description, conditions for entering the standby state in the step S706 and Tap conditions in the step S712 of FIG. 7 of the first embodiment are different from the conditions in the first embodiment.

As shown in FIG. 9, first, the user moves the detection target toward the target display 131 in order to execute an input operation to the target display 131. In this case, the processor 220 determines that a position where the detection target approaches the target display 131 and a distance from the sensor module 200 (or the sensor panel 201) to the detection target reaches the first input determination distance TS1 is a position where the input operation Tap1 is detected (S703). The detection target approaches the sensor module 200 even after the detection target reached the first input determination distance TS1 and moves to an input position (point P52) targeted by the user.

Thereafter, the user moves the detection target toward the target display 133 in order to perform an input operation to the next target display 133. In this case, the detection target moves in a direction away from the sensor module 200 (in the positive direction of the z-axis) with respect to the point P52, and then moves toward the next target display 133. That is, the point P52 is a lower vertex in the trajectory of the detection target.

When the lower vertex (point P52) is detected in the trajectory of the detection target, the processor 220 measures the amount of movement that the detection target has moved from the lower vertex (S706). As will be described later, the movement amount may be the vertical movement amount UP in the positive direction of the z-axis away from the sensor module 200 with respect to the lower vertex, or may be the horizontal movement amount MV on the x-axis that moves parallel to the main surface of the sensor module 200 with respect to the lower vertex. If the amount of movement measured as described above exceeds the threshold value, the processor 220 enters the standby state where it can detect the next input operation (S706 and S707).

The processor 220 enters the standby state as described above, disables detection of an input operation based on the first input determination distance TS1, and enables detection of an input operation based on the second input determination distance TS2. That is, the processor 220 sets the second input determination distance TS2 as a Tap condition in the step S712, and determines whether a distance from the sensor module 200 (or the sensor panel 201) to the detection target reaches the second input determination distance TS2 (S712).

After moving the detection target upward from the point P52, the user moves the detection target toward the target display 133 in order to perform an input operation to the target display 133. In this case, when the detection target approaches the target display 133 and a distance between the sensor module 200 and the detection target reaches the second input determination distance TS2, the processor 220 determines the position (point P53) of the detection target in the second input determination distance TS2 as a position where the input operation Tap2 is detected (S712). After the detection target reaches the second input determination distance TS2, the detection target approaches the sensor module 200 and moves to an input position (point P54) targeted by the user.

When the input operation Tap2 is detected as described above, the processor 220 disables the detection of the input operation based on the second input determination distance TS2. However, when the detection target moves upward and the distance between the sensor module 200 and the detection target reaches the determination start distance JG, the processor 220 enters the standby state, and the detection of the input operation based on the second input determination distance TS2 is enabled (S712, S703, and S706). Accordingly, when the detection target that has moved upward from the determination start distance JG approaches the sensor module 200 again and the distance between the sensor module 200 and the detection target reaches the second input determination distance TS2, the processor 220 determines a position (point P56) of the detection target in the second input determination distance TS2 as a position where the input operation Tap3 is detected (S712). The detection target approaches the sensor module 200 even after the detection target reaches the second input determination distance TS2 and moves to an input position (point P57) targeted by the user.

After moving the detection target to the point P57, the user moves the detection target upward in order to terminate the series of operations. In this case, the processor 220 terminates the series of input operations described above when the detection target exceeds the reset determination distance RES ("Yes" in S708).

In other words, the processor 220 detects the first input operation Tap1 when the distance from the sensor module 200 to the detection target reaches the first input determination distance TS1, and starts a series of input operations. When the series of input operations is started, the processor 220 detects an n-th input operation (for example, Tap2) when a distance from the sensor module 200 to the detection target reaches the second input determination distance TS2. After the n-th input operation (for example, Tap2) is detected, the detection target moves upward, and when the distance from the sensor module 200 to the detection target reaches the determination start distance JG, the processor enters the standby state. In this situation, when the distance from the sensor module 200 to the detection target reaches the second input determination distance TS2 again, the processor 220 detects an (n+1)-th input operation (for example, Tap3).

Although a configuration in which n is 2 is exemplified in the present embodiment, n may be a number equal to or greater than 3. In the present embodiment, although the configuration in which the detection of the third input operation Tap3 is performed based on the second input determination distance TS2 has been exemplified, the third input operation Tap3 may be performed at a position closer to the sensor module 200 than the second input operation Tap2.

As described above, according to the present embodiment, the same effects as those of the first embodiment can be obtained. In addition, in the present embodiment, although the presence or absence of the input operation is determined using the second input determination distance TS2 as an absolute criterion as in the first embodiment, the input operation is detected at a position closer to the sensor module 200 than in the first embodiment.

The functions described in two or more of the first to third embodiments can be combined. For example, detection accuracy of the input operation is improved by combining the functions described in the plurality of embodiments.

Additions, deletions, or design changes to constituent elements, or additions, omissions, or condition changes to processes made by a person skilled in the art based on each embodiment are also included in the scope of the present invention as long as the gist of the present invention is provided.

It is to be understood that the present invention provides other operational effects that are different from the operational effects provided by the aspects of the embodiments described above, and those that are obvious from the description of the present specification or that can be easily predicted by those skilled in the art.

What is claimed is:

1. A sensor system comprising:
   a sensor module including a sensor panel arranged on a display panel; and
   a processor capable of driving the sensor module in a noncontact manner,
   wherein the processor is configured to
      detect a first input operation based on a detection target approaching the sensor panel, and then
      measure an amount of movement from a first point based on movement of the detection target in a direction away from the sensor panel after the detection target approaches the sensor panel up to the first point, and
      detect a second input operation based on the detection target approaching the sensor panel again after the amount of movement exceeds a movement threshold value.

2. The sensor system according to claim 1, wherein the processor is configured to
   detect a vertex where the detection target is the farthest from the sensor panel between detection of the first input operation and detection of the second input operation, and
   detect the second input operation when the detection target moves from the vertex in a direction approaching the sensor panel beyond the movement threshold value.

3. The sensor system according to claim 1, wherein the amount of movement is an amount of vertical movement in a vertical direction away from the sensor panel with respect to the first point.

4. The sensor system according to claim 1, wherein the amount of movement is an amount of movement in a horizontal direction parallel to a main surface of the sensor panel with respect to the first point.

5. The sensor system according to claim 1, wherein the processor is configured to detect the second input operation when the detection target moves from a second point after the detection target approaches the sensor panel up to the second point.

6. The sensor system according to claim 5, wherein the processor is configured to detect the second input operation when the detection target moves from the second point in a direction away from the sensor panel.

7. The sensor system according to claim 5, wherein the processor is configured to detect the second input operation when the detection target remains stationary at the second point for a time exceeding a threshold resting time.

8. The sensor system according to claim 1, wherein the processor is configured to
   detect the first input operation when a distance from the sensor panel to the detection target reaches a first input operation determination distance, and
   detect the second input operation when a distance from the sensor panel to the detection target reaches a second input operation determination distance after the first input operation determination distance is detected, and the second input operation determination distance is closer to the sensor panel than the first input operation determination distance.

9. The sensor system according to claim 8, wherein the processor is configured to drive in a state capable of detecting a third input operation when a distance from the sensor panel to the detection target reaches a determination start distance between the first input operation determination distance and the second input operation determination distance after the second input operation determination distance is detected.

10. The sensor system according to claim 9, wherein the processor is configured to detect the third input operation when a distance from the sensor panel to the detection target reaches the second input operation determination distance after the distance from the sensor panel to the detection target reaches the determination start distance.

11. The sensor system according to claim 8, wherein the processor is configured to detect an input operation next to the first input operation by a distance from the sensor panel to the detection target reaching the first input operation determination distance when the detection target approaches the sensor panel again after the distance from the sensor panel to the detection target reaches a reset determination distance after the first input operation is detected, and the reset determination distance is further away from the sensor panel than the first input operation determination distance.

12. The sensor system according to claim 11, wherein the processor is configured to detect an input operation next to the second input operation by a distance from the sensor panel to the detection target reaching the first input operation determination distance when the detection target approaches the sensor panel again after the distance from the sensor panel to the detection target reaches the reset determination distance after the second input operation is detected.

13. A method for driving a sensor module including a sensor panel arranged on a display screen comprising:
  detecting a first input operation based on an input operation approaching the sensor panel; and then
  measuring an amount of movement from a first point based on movement of a detection target in a direction away from the sensor panel after the detection target approaches the sensor panel up to the first point; and
  detecting a second input operation based on the detection target approaching the sensor panel again after the amount of movement exceeds a movement threshold value.

14. A non-transitory computer readable storage medium storing a program executed by a processor of a sensor module including a sensor panel arranged on a display screen comprising:
  detecting a first input operation based on an input operation approaching the sensor panel; and then
  measuring an amount of movement from a first point based on movement of a detection target in a direction away from the sensor panel after the detection target approaches the sensor panel up to the first point; and
  detecting a second input operation based on the detection target approaching the sensor panel again after the amount of movement exceeds a movement threshold value.

* * * * *